(12) United States Patent
Hemken et al.

(10) Patent No.: US 6,246,821 B1
(45) Date of Patent: Jun. 12, 2001

(54) OPTICAL WAVEGUIDE WITH PROTECTIVE TUBE

(75) Inventors: Heinz Jurgen Hemken, Herzogenrath; Wolfgang Scheideler, Leuchtenberg; Helmut Steinberg, Stornstein; Peter Zamzow, Bochum, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/438,834

(22) Filed: Nov. 12, 1999

(30) Foreign Application Priority Data

Nov. 13, 1998 (DE) .............................. 198 52 480
Jan. 15, 1999 (DE) .............................. 199 01 354

(51) Int. Cl.$^7$ ...................................... G02B 6/44
(52) U.S. Cl. ...................... 385/101; 385/100; 385/102
(58) Field of Search ........................... 385/100, 101–114; 174/102 R; 156/171

(56) References Cited

U.S. PATENT DOCUMENTS 4,435,238 * 3/1984 Smith .................................. 156/171
5,001,303 * 3/1991 Coleman et al. ................ 174/102 R
5,261,021 * 11/1993 Pasta et al. ........................ 385/100

* cited by examiner

Primary Examiner—Phan T. H. Palmer
(74) Attorney, Agent, or Firm—Sughrue, Mion, Zinn, Macpeak & Seas, PLLC

(57) ABSTRACT

An optical waveguide, in particular for a vehicle, with an optical fiber (1) which is composed of polymer material and with a protective layer which encloses the fiber (1). The waveguide includes a metal pipe (2) having a corrugation at an angle to its longitudinal axis (4), the pipe forming an electrical conductor, and being externally insulated (5).

30 Claims, 3 Drawing Sheets

OPTICAL WAVEGUIDE WITH PROTECTIVE TUBE

This application is based on and claims the benefit of German Patent Application No. 19852480.3 filed Nov. 13, 1998, and German Patent Application No. 19901354.3 filed Jan. 15, 1999, which are incorporated by reference herein.

BACKGROUND OF THE INVENTION

The invention concerns an optical waveguide, in particular for a vehicle, with an optical fiber composed of a polymer material and a protective layer which encloses the fiber.

A problem in vehicle construction is that the increasing use of electronic components in vehicles has led to an intensive growth in conductors which must be connected. In order to reduce the length of the conductors and their total weight and to simplify the design and the fabrication of the wiring harness, bus systems have been developed. They make data transmission between several components over a common conductor possible and thus reduce the required number of conductors.

High rates of transmission can be achieved through bus systems in particular with optical waveguides which work together with optical or electro-optical components. The optical fibers of the optical waveguide include a light-conductive core which is enclosed by a jacket for routing the light as well as possibly one or more outer protective layers. In vehicle construction polymer optical waveguides, for example composed of polymethylmethacrylate (PMMA) and/or fluorinated PMMA, have proven advantageous. Gradient index fibers with a diameter of 1 mm are suitable. In comparison with glass fibers, they offer the advantages of mechanical robustness, ease of handling and fabrication as a result of the large diameter, and the possibility of operation using visible light. The higher degree of damping in comparison to glass, on the other hand, is subordinated in importance in the short transmission paths in vehicles.

It has proven to be a drawback, however, that additional electrical conductors are necessary for the supply of electric power for sensors and actuators. In addition, the optical properties of the common polymer fibers are destroyed or significantly impaired through the absorption of and chemical reaction with substances in their environment. In addition to operating fluids such as lubricants or fuels, the large number of plastic materials used in vehicles which continuously give off substances such as degassing educts or fuels after conclusion of the manufacturing process present a problem. In addition, as a rule, good protection from moisture and thermal stress is required for the fibers, particularly in the case of use in the engine compartment or of linking of sensors or actuators outside of the chassis. Arranging the fibers in a protective sheath or in a plastic tube as is conventional in the state of the art is inadequate for this purpose, since polymers as a rule are not sufficiently gas-tight.

It is also known to provide metal pipes with a corrugation to improve their flexibility and transverse pressure stability as components of electrical cables. The corrugation is at an angle to the longitudinal axis of the pipe. Both spiral corrugations with crests oriented at an acute angle to the longitudinal axis of the pipe as well as corrugations of closed rings oriented at right angles to the axis are common. Through variation of the depth of the corrugations and the distance between them, the mechanical properties of the pipe such as flexibility can be set within broad limits.

SUMMARY OF THE INVENTION

Against this background, an object of the invention is to develop an optical waveguide which is reliably protected from environmental influences and which facilitates a simple connection of signal processing components with a minimum number of conductors.

This object is achieved according to the invention by providing a protective layer of a metal pipe which has a corrugation at an angle to its longitudinal axis, the pipe forming an electrical conductor and being provided with exterior insulation.

In the invention, a polymer-optical fiber is used such as a gradient index or incremental index fiber which is composed of PMMA, fluorinated PMMA, or another plastic with suitable optical properties. The exterior diameter of the fiber is preferably around 1 mm, while the core diameter is usually clearly greater than the diameter of the jacket so that the simple optical coupling and connecting of the fibers is ensured. It is conceivable for the fiber to be operated with a single wavelength or for several different wavelengths of light to be transmitted over one fiber.

The fiber is enclosed by a surrounding corrugated metal pipe, the corrugation of which may be configured as closed rings or as a spiral shape. Depths and periods of the corrugation are set such that the elastic properties of the metal ensure reliable protection for the fibers both from radial and from axial stresses. The fiber lies free in the pipe, the interior diameter of which is greater than the diameter of the fiber. Therefore the possibility of transmission of force from a tensile load acting axially on the pipe onto the fiber is excluded. The corrugation makes possible a high degree of flexibility of the pipe with a specified minimum bending radius which excludes the possibility of buckling of the fiber and thus an impairment of its optical properties. The minimum bending radius of the pipe is preferably at least 10 times the diameter of the fiber. In addition, the metal pipe forms a moisture-tight resistive layer around the fiber which prevents damage through solvents or gaseous substances from the environment. It is conceivable for the interior of the pipe to be provided with a gelatinous or fluid fill material with hydrophobic or pollution-absorbing properties in which the fiber is embedded.

On the outside, the metal pipe is provided with electrical insulation, for example a layer of a polymer such as a polyolefin, e.g., polyethylene. In addition to compact polymers, expanded materials are also suitable for insulation, e.g., polyurethane foam. It is advantageous to use halogen-free and/or nonflammable materials for the insulation as well as any exterior jacket to improve safety in the case of fire. With the insulation, an electrical conductor is created which serves in particular for supplying power to the components which are connected to the optical fiber. Thus the optical waveguide with its protective pipe forms a hybrid cable which is simultaneously suited for transmission of energy and data. It is fundamentally also possible to transmit electrical signals through the corrugated pipe. Metals with good conductivity such as copper or aluminum are especially suitable as materials for the pipe or—depending on the desired electrical and mechanical properties—alloys such as brass or bronze. If mechanical strength is of foremost importance, steel is also fundamentally conceivable. The electrical insulation in such case will prevent contact corrosion with the body of the vehicle or with other substrates on which the conductor is laid. The wall thickness of the metal pipe is advantageously 100 $\mu$m to several 100 $\mu$m, whereby a conductive cross section of the wall adequate for the transmission of current is necessary which preferably is in the range of one to several $mm^2$.

The proposed optical waveguide is distinguished through reliable protection of the optical fiber from environmental influences such as mechanical stresses in transverse and longitudinal direction, high temperatures, chemical substances, and vibrations. In addition, good protection from rodents is provided. Interactions between the signals to be transmitted or exterior electromagnetic fields is prevented. Handling of the optical waveguide is simple, with the metal pipe protecting the polymer fiber from damage during processing and installation.

The optical waveguide is preferred for connecting components which require both a supply of electric energy and optical signal transmission. Its use particularly in modular systems is conceivable whereby multiplex operation of the optical waveguide with several wavelengths is advantageous. Along with use in vehicle construction, e.g., construction of automobiles, aircraft, or ships, its use is also advantageous in other small-space areas which require special protection of the optical waveguide, such as in machine construction or chemical plants. Particularly in vehicle construction, it is possible both to use the optical waveguide according to the invention for the connection of information systems, e.g., telephone, radio, or navigation systems, as well as in control systems with sensors and actuators. The network structures used can be of any configuration; for example they can be ring-shaped or star-shaped.

In an advantageous configuration of the invention, the external diameter of the corrugated metal pipe is up to 6 mm, preferably 2 mm to 4 mm. In this way, good flexibility of the pipe can be achieved with high radial strength and adequate electrically conductive cross section. The handling of the optical waveguide is simplified accordingly. Preferably, the metal pipe encloses a single optical fiber.

Due to simple manufacturing, a metal pipe with a longitudinal welded seam lends itself to use as the protective pipe. It is preferably manufactured by forming a metal band around the optical conductor into a pipe the interior diameter of which is greater than the diameter of the conductor. Following this, the pipe is welded along its edges, for which purpose laser welding is particularly suitable. Finally, the pipe is corrugated and insulated.

It is advantageous in many cases for the optical fiber to be provided with an exterior protective sheath of polymer material which encloses the fiber jacket and is generally in contact with it. Particularly advantageous are light-absorbing protective sheaths which avoid a disturbance of the transmitted signals through the incidence of light in the areas at which the fiber exits the metal pipe. In addition, the protective sheath provides mechanical protection of the fiber both in areas at which it exits the metal pipe as well as from abrasion in its interior, such as in the case of frequent vibrations.

Since the optical fiber is reliably protected in the interior of the pipe, the hybrid conductor can be handled like a conventional electrical conductor. Both the metal pipe as well as its insulation can be connected in a watertight manner and/or in fixed position with connector elements. Connector elements include all components which are fixed to the conductor during fabrication. Examples are electrical connectors, optical connectors, or hybrid connectors for the conductors, seals, or sleeves for feedthroughs through partitions, such as between the engine compartment and the passenger compartment of an automobile, or fastening elements for attachment or stress relief. Suitable methods for a watertight or fixed connection are, by way of example, welding, soldering, crimping, gluing, integral casting, or spraying or the use of spring or clamp connections, e.g., insulation displacement connections. The electrical connection of the corrugated pipe to other components can also be established in this manner.

Preferably the end of the protective pipe is provided with a closure element which has an opening for the optical fiber to pass through. Advantageously the opening has a larger diameter than the fiber so that a gap is present between the two. If needed, the gap can be closed such as with a sealing compound. The closure element simplifies mechanical fixing of the protective pipe as well as its electrical connection to the extent it is composed of a conductive material, in particular a metal. Crimping the closure element onto the protective pipe lends itself for attachment. In the case of spiral corrugation of the pipe, an interior or exterior thread on the closure element is advantageous, with which it can be screwed onto the corrugation of the protective pipe or into the opening of the protective pipe.

Preferably a cable with the optical waveguide according to the invention includes at least one additional electrical conductor which is insulated from the protective pipe of the optical waveguide. This additional electrical conductor is suitable as an electrical return line if the automobile body, or frame or substrate of a vehicle or of a device cannot be used as an electrical return line, e.g., in the case of a vehicle with a plastic body. In like manner, various supply voltages can in this way be carried to a consumer so that, for example, automobile electrical systems with several voltages are possible. Examples of suitable material for the conductors are metals such as copper or aluminum. In the simplest case, the additional conductors(s) are wires or stranded wires.

The arrangement of the additional conductor in the interior of the pipe has proven to be advantageous. In this way, a cable with a small cross section is created. Alternatively it is possible for the protective pipe of the optical waveguide and the additional electrical conductors to be borne parallel in a common jacket.

A pipe is especially suitable as an additional conductor. Preferably, it runs coaxially with the protective pipe of the optical waveguide. In this case, the optical fiber is enclosed by the two pipes, thus improving its protection. A pipe with a smooth surface is conceivable as the inner pipe, since the flexibility of the cable is primarily determined by the mechanical properties of the exterior pipe. Thus an especially small cross section of the cable is achievable. In addition, one of the pipes, preferably the inner one, can have an open longitudinal slot to simplify manufacture. The mechanical stability and radial gas imperviousness in such case is ensured in that the other pipe is closed all the way around, e.g., through welding.

To achieve a high degree of flexibility of the cable, corrugated pipe is used both for the protective pipe and for the additional conductor(s).

To insulate the electrical conductors from each other, expanded materials as well as compact materials are suitable, whereby foams produced through physical mixing, for example a polypropylene foam, or expanded materials generated through chemical reaction can be used. Expanded insulation reduces the weight of the cable and has good electrical properties. It is suitable particularly as mutual insulation of pipes which pass coaxially one through the other.

In many cases it is advantageous for a cable to include at least two polymer optical fibers with one protective pipe each. In this way, for example, it is possible to route optical conductors together which are independent of each other for safety reasons. Furthermore, differing supply voltages can be conducted to a user through protective pipes insulated from each other or conduction out from and back to the voltage source can be established. If more than two protective pipes are joined to each other, it is advantageous to arrange them in one plane to retain the flexibility of the cable. Useful methods of connecting the pipes are to glue their insulation to each other, to extrude a common jacket around the insulation, or to extrude a coherent insulation around the protective pipes. It may also be advantageous to provide a notch or a narrow point which is arranged in the jacket or the insulation between the protective pipes and facilitates their separation.

Although the optical waveguide according to the invention is also suitable for connecting individual components, it is particularly useful as a component of the wiring harness of a device or a vehicle. In this way both the total weight and the overall length of the wires of the wiring harness can be significantly reduced.

To connect the optical fibers of optical waveguides according to the invention to each other, an optical coupler is advantageous, including special star couplers which permit the connection of several optical waveguides to each other.

To ensure adequate signal intensity in the case of relatively long transmission paths or of the coupling of several optical waveguides, a coupler with an optically active coupling medium which amplifies the optical signals is advantageous.

The coupler is also useful for connecting to the power supply of the optical amplifier. This configuration is advantageous in particular in the case of an active coupler which requires a power supply for the optical amplifier. In addition, terminals of the coupler which are connected to each other make possible the connection of the electrical conductors to each other. In this manner just one electrical connection is required for electrical conductors routed in various optical waveguides. Preferably the coupler encompasses a power supply as well as a ground connection if appropriate and additional power supplies with varying voltage corresponding to the configuration of the electrical conductor.

BRIEF DESCRIPTION OF THE DRAWING

The invention will be more clearly understood from the following description in conjunction with the accompanying drawings, wherein.

DETAILED DESCRIPTION OF THE INVENTION

Figure 1:
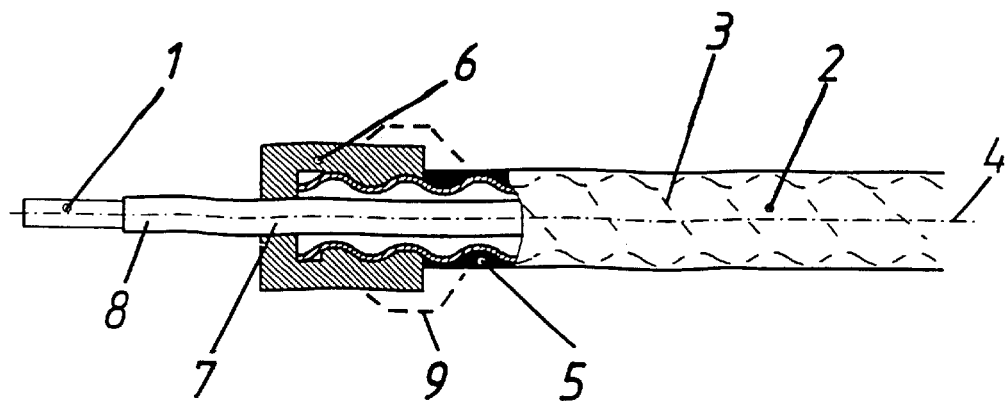
FIG. 1 is a cut view of an optical waveguide according to the invention.

The optical waveguide includes an optical fiber 1 with a core and a jacket of polymer material, a pipe 2 of metal which provides mechanical protection for fiber 1, and an electrical conductor. The wall of pipe 2 is corrugated for radial strengthening and improved flexibility, the corrugation passing in the form of a spiral 3 around axis 4 of the optical waveguide. On the outside, pipe 2 is provided with insulation 5 such as a coating of polyethylene. This prevents short circuits between pipe 2 and a support element such as the part of the automobile body to which it is mounted.

At its end, pipe 2 is connected to a closure element 6 which by way of example is crimped on or is screwed to the spiral-shaped corrugation. It is also composed of metal and serves for the mechanical attachment and electrical connection of pipe 2. A central opening 7 makes it possible for fiber 1 to be brought out of pipe 2 for connection to other components. At the same time, a protective sleeve 8 of an opaque polymer prevents damage to fiber 1 or incidence of light in this area. A protective sleeve 8 is also advantageous in the interior of pipe 2 to avoid abrasion of fiber 1.

Sprayed material 9, depicted with dotted lines, connects closure element 6 in a moisture-tight manner to insulation 5. It is also possible to shape elements of a plug connector in this manner, such as projections for routing or latching.

Figure 2:
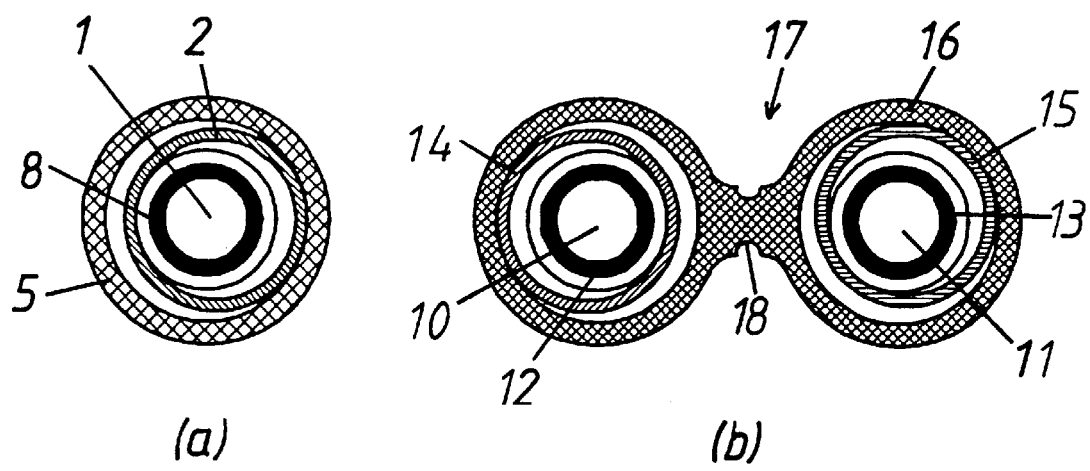
FIGS. 2a–2b illustrates cross sections through various cables with optical waveguides according to the invention.

FIG. 2a shows a cross section through the optical waveguide in FIG. 1. The central fiber 1 with its protective sleeve 8, pipe 2, and the external insulation 5 can be recognized.

FIG. 2b depicts a cross section through a hybrid cable which includes two optical waveguides with optical fibers 10, 11. They are each situated in a protective sleeve 12, 13 and are arranged in metal pipes 14, 15. Both pipes 14, 15 are enclosed by common insulation 16. A narrow point 17 with a notch 18 enables easy separation of the two optical waveguides. With the depicted hybrid cable, various supply voltages can be applied to a connected electro-optical component through the two pipes 14, 15 which are insulated from each other. The two fibers 10, 11 make it possible to provide two independent systems for optical transmission of data, e.g., to increase reliability.

Figure 3:
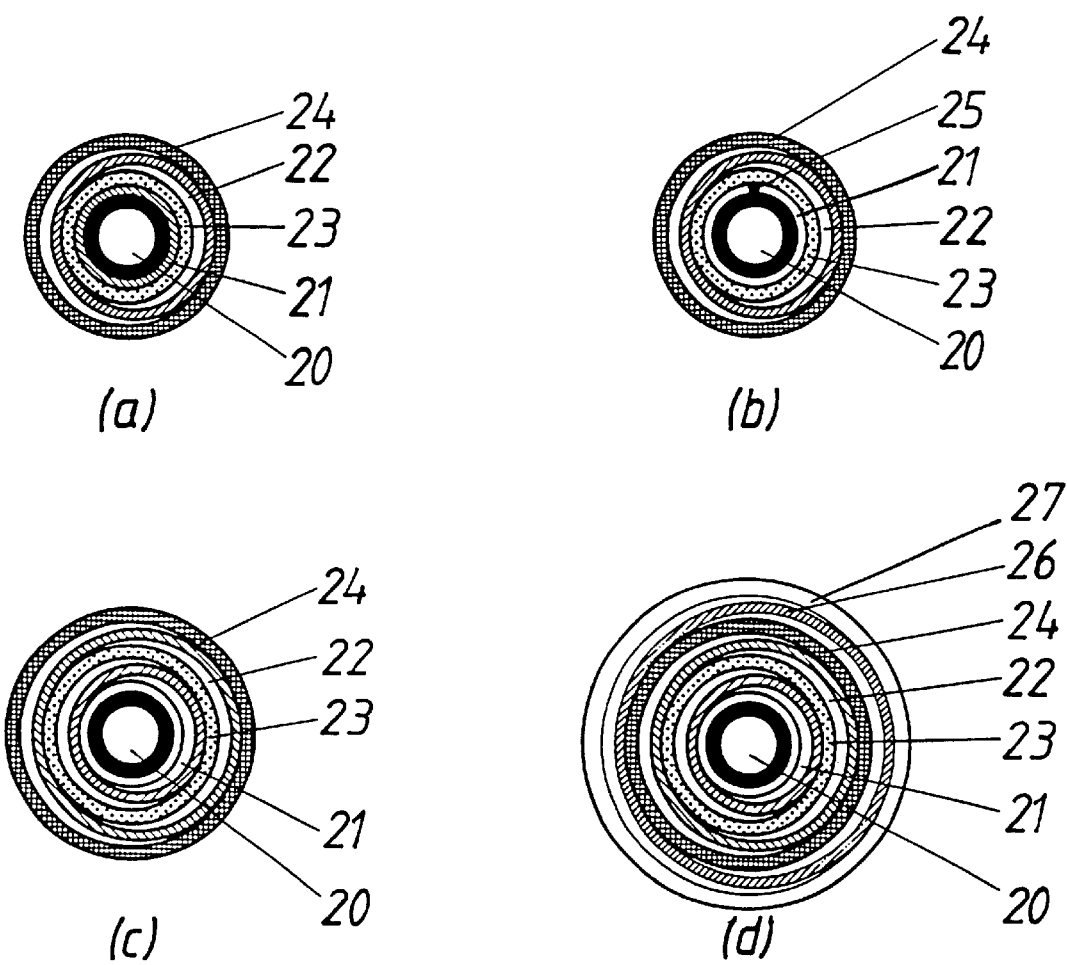
FIGS. 3a–3d illustrate cross sections through various cables with several electrical conductors.

FIG. 3 depicts cross-sections through hybrid cables with several electrical conductors. The cables in FIGS. 3a and 3b with a diameter of 3 mm to 4 mm, for example, are made up of one polymer optical fiber 20 each in a smooth inner pipe 21 which is runs coaxially in an outer corrugated pipe 22. Both pipes 21, 22 are composed of metal and serve as electrical conductors which are separated from each other through an expanded or compact insulation 23 arranged between them. Likewise pipe 22 is externally provided with insulation 24.

Since outer pipe 22 already ensures mechanical protection and a gastight seal of fiber 20 from the environment, inner pipe 21 can have an open longitudinal slot 25. Thus, it can be produced in simple manner through mechanical forming without it being necessary to weld or otherwise seal the longitudinal slot 25. Through the use of two enclosing closed pipes 21, 22, however, the protection of fiber 20 can be improved.

FIG. 3c shows a configuration of the hybrid cable with two corrugated metal pipes 21, 22. In this manner, good flexibility can be achieved even with relatively large diameters of the cable.

In the cable depicted in FIG. 3d, there are three concentric corrugated pipes 21, 22, 26 between which insulation 23, 24 is located. They make it possible to supply a consumer with two different supply voltages, e.g., 12V and 42V, through corrugated pipes 21, 22. Outer corrugated pipe 26 is preferably electrically coupled to the body of the automobile, or the frame of a device, and serves as return circuit. In this case, an outer jacket 27 can be omitted, although such a jacket 27 is still advantageous to protect against corrosion or deviation of the voltage of corrugated pipe 26.

As a result, hybrid cables are created in this manner which make possible a significant simplification of the wiring of automobiles accompanied by reduction of weight and lasting reliability of function.

Figure 4:
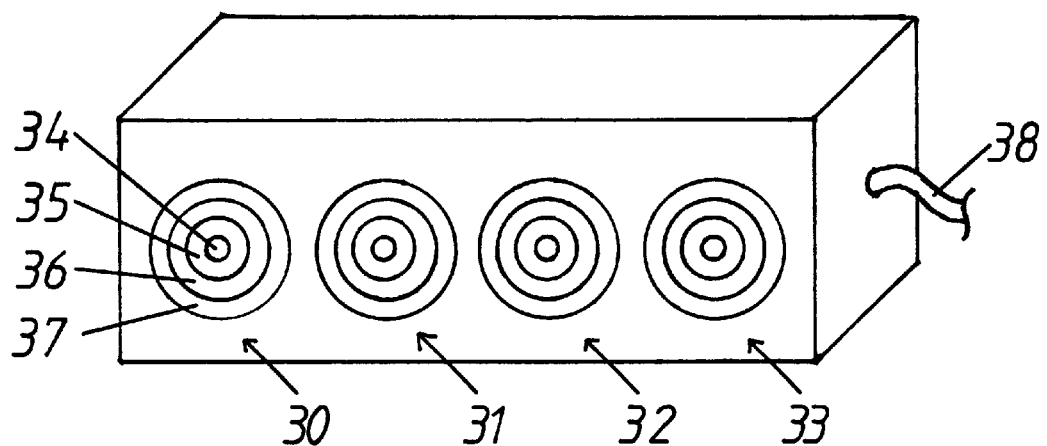
FIG. 4 is a view of a star coupler for the optical waveguide according to the invention.

Preferably the optical waveguides according to the invention are connected with a star coupler as is depicted in FIG. 4. The coupler includes several, e.g., four, connections 30–33, each of which can be connected to an optical waveguide according to the invention. In the center of each connection 30–33 an optical coupling element 34 such as a lens is present which enables coupling and decoupling of light into fiber 1. Coupling elements 34 of all connections are connected to each other via an optical star coupler, preferably with an optical amplification medium.

Coupling element 34 is surrounded concentrically by each of three electrical contacts 35–37. By way of example, inner contact 35 serves for connection of an electrical conductor to a first power supply (e.g., 12V), contact 35 for connection of a second electrical conductor to a second power supply (e.g., 42V), and contact 37 for ground contact. Like-kind contacts 35–37 of all connections 30–33 are electrically connected with each other. It is advantageous for contacts 35–37 to be configured as plug contacts in which, by way of example, the closure element of an optical waveguide can be inserted. Alternatively it is conceivable for contacts 35–37 to be configured with threads into which a closure element or a spirally corrugated electrical conductor of an optical waveguide can be screwed. The coupler advantageously forms the connection for all electrical conductors of the optical waveguides to the power supply which takes place over an electrical feed wire 38 of the coupler.

Figure 5:
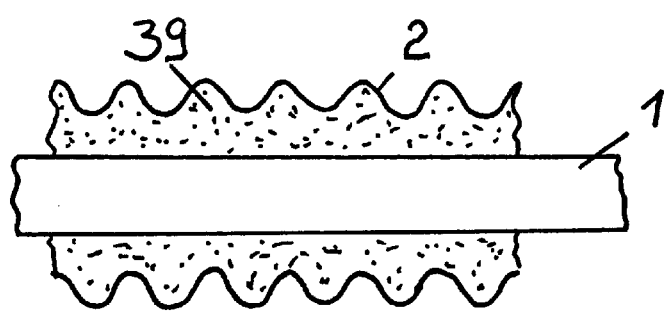
FIG. 5 is a cut view of a further optical waveguide according to the invention.

In FIG. 5, a further exemplary embodiment of an optical waveguide according to the invention is depicted. A layer 39 of an expanded plastic is provided between fiber 1 and pipe 2. Expanded layer 39 is composed of polyethylene, polypropylene or another temperature-resistant plastic. The degree of foaming should be above 50%, preferably up to 85%. The wall thickness of expanded layer 39 is preferably 0.3 mm to 2.0 mm. The essential advantage of the expanded layer is that the optical waveguide can be used with ambient temperatures up to 130° C. In addition, the expanded layer forms a cushion for the fiber. It is also advantageous for the expanded material to have a soft mechanical characteristic which results in no increase in damping for the fiber. It ensures that mechanical forces do not act on the fiber in either radial or axial direction.

Manufacturing advantageously is by extrusion of an expanded plastic layer onto the fiber, whereby the foaming process is carried out chemically or mechanically. Following foaming, a metal band is formed longitudinally around the fiber 1 which is provided with an expanded layer 39 into a pipe with a longitudinal slot. After the longitudinal slot is welded, the pipe can be drawn down to a smaller diameter after which it is provided with an annular or spiral corrugation in the same work step. Afterward an addition synthetic jacket can be extruded onto the corrugated pipe.

What is claimed is:

1. An optical waveguide, in particular for a vehicle, comprising an optical fiber (1) composed of polymer material, and a protective layer surrounding the fiber (1), wherein the protective layer is a metal pipe (2) having a corrugation at an angle to its longitudinal axis (4); the pipe (2) forming an electrical conductor and being provided with insulation (5) on its outside.

2. An optical waveguide according to claim 1, wherein a maximum external diameter of the pipe (2) is no greater than 6 mm.

3. An optical waveguide according to claim 2, wherein the maximum external diameter of the pipe (2) is in the range of 2 mm to 4 mm.

4. An optical waveguide according to claim 1, wherein the corrugation is a spiral or an annular corrugation.

5. An optical waveguide according to claim 1, wherein the optical fiber (1) has a protective sleeve (8) of polymer material.

6. An optical waveguide according to claim 1, wherein a space between the fiber (1) and the pipe (2) is filled with an expanded material.

7. An optical waveguide according to claim 6, wherein the expanded material has a foamed degree of 50% to 85%.

8. An optical waveguide according to claim 6, wherein the expanded material is composed of a polymer.

9. An optical waveguide according to claim 8, wherein the expanded material is composed of polypropylene foam.

10. An optical waveguide according to claim 6, wherein the expanded material has a soft mechanical characteristic.

11. An optical waveguide according to claim 6, wherein a wall thickness of the layer of expanded material is between 0.2 mm and 2 mm.

12. An optical waveguide according to claim 1, further comprising a connecting element mounted watertight on at least one of the pipe (2) and the insulation (5).

13. An optical waveguide according to claim 12, wherein the pipe (2) is provided at the end with a closure element (6) which has an opening (7) through which the fiber (1) passes.

14. An optical waveguide according to claim 13, wherein the closure element (6) is crimped to the pipe (2).

15. An optical waveguide according to claim 13, wherein the closure element (6) is composed of metal.

16. An optical waveguide according to claim 13, wherein the closure element (6) is screwed onto the corrugation of the pipe.

17. An optical waveguide according to claim 1, wherein the optical waveguide is an element of a cable which includes at least first and second electrical conductors.

18. An optical waveguide according to claim 17 characterized in that the second conductor is arranged in the interior of the pipe (2).

19. An optical waveguide according to claim 17, wherein the conductors are insulated from each other via a layer of expanded material.

20. An optical waveguide according to claim 17, wherein the cable includes at least two optical fibers (1) each in a pipe (2).

21. An optical waveguide according to claim 17, wherein the second conductor is a pipe (21).

22. An optical waveguide according to claim 17, wherein the second conductor is a corrugated pipe (21).

23. An optical waveguide according to claim 1, coupled to a second optical waveguide by an optical coupler.

24. An optical waveguide according to claim 23, wherein the coupler includes an electrical contact (35–37) which is connected to one of the electrical conductors.

25. An optical waveguide according to claim 24, wherein the coupler forms a power supply of the electrical conductor.

26. An optical waveguide according to one of claim 24, wherein the coupler connects the electrical conductors of different optical conductors.

27. An optical waveguide according to claim 23, wherein the coupler includes an optical amplifier.

28. An optical waveguide according to claim 1, wherein the optical waveguide is a component of the wiring harness of a vehicle or a device.

29. An optical waveguide according to claim 1, further comprising a connecting element mounted in fixed position on at least one of the pipe (2) and the insulation (5).

30. An optical waveguide according to claim 1, wherein the pipe (2) is composed of a metal band with a welded longitudinal seam.

* * * * *